UNITED STATES PATENT OFFICE.

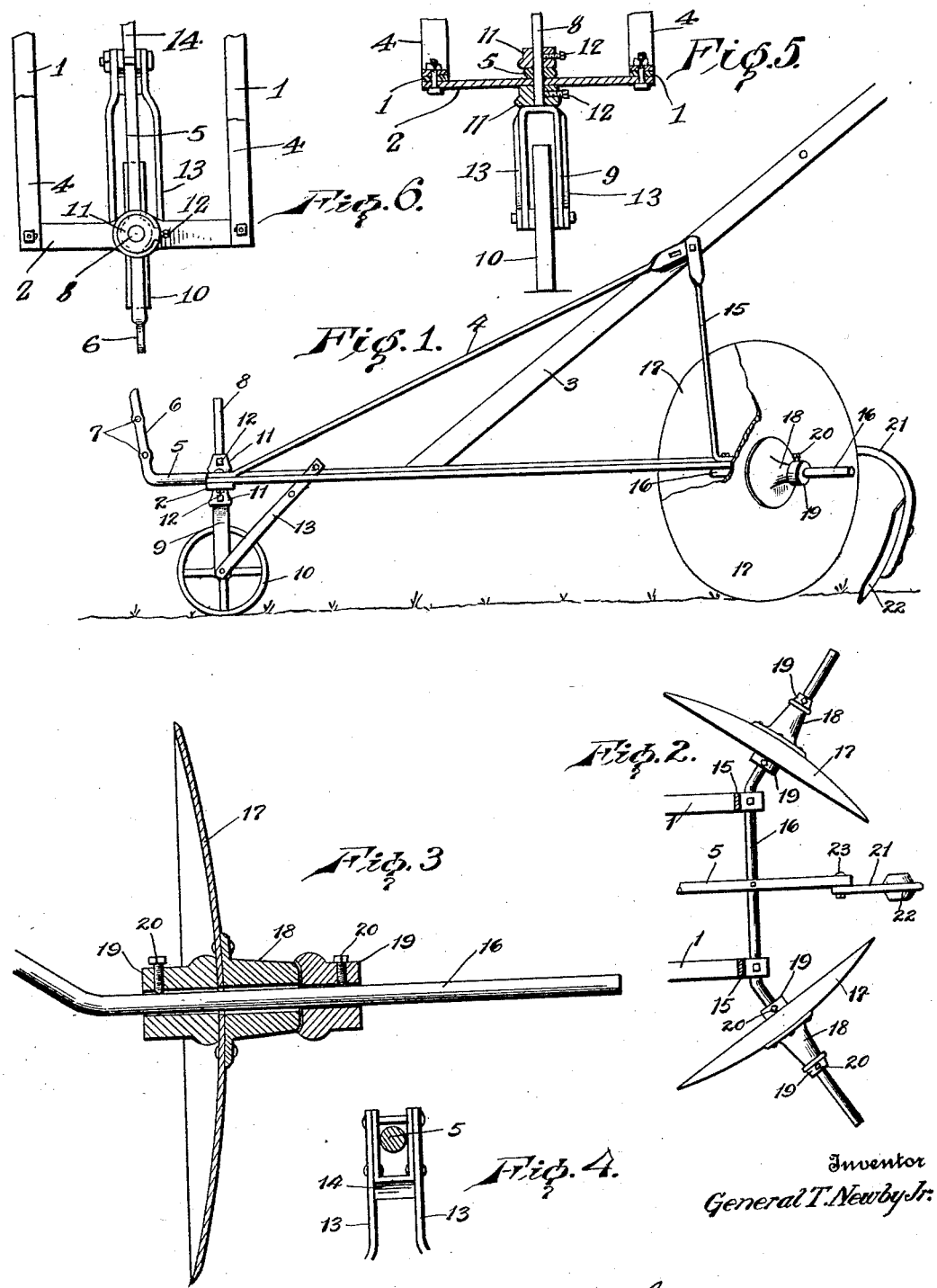

GENERAL T. NEWBY, JR., OF NEW BERN, NORTH CAROLINA.

CULTIVATOR.

1,408,902. Specification of Letters Patent. Patented Mar. 7, 1922.

Application filed November 20, 1920. Serial No. 425,373.

*To all whom it may concern:*

Be it known that I, GENERAL T. NEWBY, Jr., a citizen of the United States, residing at New Bern, in the county of Craven and State of North Carolina, have invented certain new and useful Improvements in Cultivators, of which the following is a specification.

This invention relates to agricultural implements and has special reference to that type of implements in which rolling disks are employed to cultivate the ground and throw loose soil around the stems of young growing plants. The invention seeks to provide an implement which may be easily adjusted to regulate the depth to which the disks will cut into the ground and also to provide means whereby the disks may be adjusted transversely relative to the line of travel so as to accommodate hills of different widths and also to work upon rows which may be spaced at different distances apart. The invention also seeks to provide an implement which may be utilized to open a furrow along the ridge of a hill before seed has been planted so that a proper bed will be prepared in which to place the seed. These several stated objects and other objects which will appear incidentally in the course of the following description, are attained in such a device as is illustrated in the accompanying drawings, and the invention consists in certain novel features which will be particularly pointed out in the appended claims.

In the drawings—

Figure 1 is a side elevation, partly broken away, of an implement embodying my improvements;

Fig. 2 is a view, partly in plan and partly in horizontal section, of the rear end of the implement;

Fig. 3 is an enlarged sectional view showing the manner of mounting the cultivator disks;

Fig. 4 is a detail transverse section showing the connection between the draw rod and the braces for the front wheel;

Fig. 5 is a detail, partly in elevation and partly in section, of the front end of the implement;

Fig. 6 is a detail plan view of the front end of the implement.

In carrying out my invention, I employ a frame consisting of side bars 1 connected at their front ends by a cross bar 2 and from which handles 3 of the usual form extend upwardly and rearwardly. A brace 4 is provided at each side of the frame and is secured rigidly at its front end to the front end of the adjacent side bar 1 and extends upwardly and rearwardly therefrom to be secured to the respective adjacent handle, as will be readily understood. A perch or draw bar 5 is also secured to the cross bar 2 at the center of the same and extends longitudinally of the frame, the front end of said draw bar being turned upwardly, as shown at 6, and provided with openings 7 to permit the attachment of a draft device. Through the cross bar 2 and the draw bar 5, a stem 8 passes vertically and the lower end of said stem carries a yoke 9 in which is mounted a wheel 10 to roll upon the ground and support the front end of the frame. Above and below the cross bar and the draw bar, collars 11 are secured upon the said stem 8 by set screws 12 so that the front end of the frame may be adjusted vertically to cause the rear end thereof to run relatively closer to the ground and thereby regulate the depth to which the cultivator disks will enter the ground. To relieve the strain upon the stem 8 and the yoke 9 and counteract any tendency of the same to bend while at work, I provide the braces 13 which are fitted at their lower ends upon the axle of the wheel 10 and have their upper ends extended past the draw bar 5, as shown most clearly in Fig. 4. To the inner sides of the said braces, I secure a stirrup 14 which spans the draw bar and thereby holds the wheel to a path directly below the draw bar while permitting more or less freedom of action so that the supporting structure may readily follow irregularities in the surface of the ground. As shown in Figs. 1 and 5, a bolt connecting the upper extremities of the braces 13 and the bracket 14 passes over the draw bar.

At the rear ends of the side bars 1, I secure standards 15 which have their upper ends secured to the respective adjacent handles 3 and a rear supporting bar and axle 16 is secured to the ends of the side bars 1 by the same bolts which secure the lower ends of the said standards thereto, the said combined supporting bar and axle being secured to the draw bar 5 at its center by a bolt inserted therethrough or by a similar rigid connection as will be readily understood. The member 16 has its intermediate portion disposed at a right angle to the side bars but its end portions laterally beyond the side bars are deflected rearwardly, as shown most clearly in Fig. 2, so that the disks 17 carried thereby will be disposed at an angle to the line of travel and cut into the ground in the usual manner. The said disks are each provided with a hub 18 on its outer side which loosely encircles the axle or supporting bar 16 and stop collars 19 at the opposite sides of the disk prevent the same moving longitudinally upon the axle. The stop collars 19 are secured in position by set screws 20 mounted therein and bearing upon the axle and it will be readily understood that by releasing the set screws the stop collars and the disk with its hub may be shifted longitudinally of the axle so as to be set at any point thereof and if the set screws be then turned home the disk will be secured in the set position. I am thus enabled to adjust the disks to the width of rows and also enabled to cause the disks to work at opposite sides of adjacent rows, leaving the opposed sides of the rows uncultivated, so that if the implement be drawn a second time over the field the work usually requiring the use of a gang of disks may be performed by the use of my implement employing only two disks. It will also be seen that either disk may be removed from its support to be sharpened or to permit the substitution of a new disk for a worn out or broken disk so that there will be no substantial loss of time in the use of the implement while making repairs.

The rear end of the draw bar 5 extends rearwardly beyond the supporting bar and axle 16 and to the extremity of the said draw bar I secure a standard 21 having a shovel blade 22 secured to its free end. This standard 21 with its blade 22 may be swung upwardly and forwardly about its securing bolt 23 when its use is not desired but if it be sought to open the ridge of a row or hill at the same time that the adjacent soil is pulverized the standard may be turned downwardly and rearwardly to the position shown in the drawings whereupon the blade will run along the ridge of the row or hill and cut through the same to form a furrow in which the seed may be deposited.

My improved implement is exceedingly simple in its construction and is free of any complicated arrangement of its parts so that it may be produced at a low cost and is not apt to get out of order so that the cost of upkeep will be negligible. It may be easily drawn over the field by a draft animal or a light tractor and readily steered by an operator walking behind the implement and manipulating the handles 3 in a well-known manner. Due to the open construction of the frame all the parts may be constructed of light metal so that while there will be no excessive weight the structure will be strong and durable.

Having thus described the invention, what is claimed as new is:

1. In an agricultural implement, the combination of a supporting frame comprising side bars, and a cross bar connecting the front end thereof, a supporting bar connecting the rear ends of said side bars, disks carried by said supporting bar, a draw bar secured to said supporting bar and the cross bar and extending forwardly beyond said cross bar and having its forward extremity turned upwardly, means for attaching a draft device to said upturned extremity, and a rolling support for the front end of the frame.

2. In an agricultural implement, the combination of a supporting frame, a central draw bar disposed longitudinally of the frame and secured rigidly thereto, the rear end of the said draw bar extending rearwardly beyond the rear end of the frame, rolling cultivator disks supported upon the rear end of the frame at the outer sides thereof, a standard pivotally attached to the rear extremity of the draw bar, and a furrow opener carried by the free end of said standard.

In testimony whereof I affix my signature.

GENERAL T. NEWBY, Jr. [L. S.]